United States Patent
Zhou (10) Patent No.: US 10,436,461 B2
(45) Date of Patent: Oct. 8, 2019

(54) DEHUMIDIFIER

(71) Applicant: Ningbo Free Trade Zone Refine Mould Technology Co., LTD, Ningbo (CN)

(72) Inventor: Rui Zhou, Ningbo (CN)

(73) Assignee: NINGOBO FREE TRADE ZONE REFINE MOULD TECHNOLOGY CO., LTD., Ningbo (CN)

( * ) Notice: Subject to any disclaimer, the term of this patent is extended or adjusted under 35 U.S.C. 154(b) by 64 days.

(21) Appl. No.: 15/588,807

(22) Filed: May 8, 2017

(65) Prior Publication Data

US 2018/0172290 A1   Jun. 21, 2018

(30) Foreign Application Priority Data

Dec. 16, 2016   (CN) .......................... 2016 1 1165414

(51) Int. Cl.
| | |
|---|---|
| *F24F 3/153* | (2006.01) |
| *F24F 5/00* | (2006.01) |
| *F24F 13/20* | (2006.01) |
| *F24F 13/22* | (2006.01) |
| *F24F 11/30* | (2018.01) |
| *F24F 3/14* | (2006.01) |
| *F24F 110/20* | (2018.01) |

(52) U.S. Cl.
CPC ............ *F24F 3/153* (2013.01); *F24F 5/0017* (2013.01); *F24F 11/30* (2018.01); *F24F 13/20* (2013.01); *F24F 13/222* (2013.01); *F24F 2003/1452* (2013.01); *F24F 2110/20* (2018.01); *F24F 2221/125* (2013.01); *Y02E 60/147* (2013.01)

(58) Field of Classification Search
CPC .......... F24F 11/30; F24F 13/20; F24F 13/222; F24F 2003/1452; F24F 2110/20; F24F 2221/125; F24F 3/153; F24F 5/0017
USPC .......................................................... 62/173
See application file for complete search history.

(56) References Cited

U.S. PATENT DOCUMENTS

| | | | | |
|---|---|---|---|---|
| 5,921,088 A | * | 7/1999 | Imaizumi ................. | F24F 3/14 62/271 |
| 6,019,170 A | * | 2/2000 | Yokoya ................ | F28D 9/0062 165/166 |

(Continued)

*Primary Examiner* — Henry T Crenshaw
(74) *Attorney, Agent, or Firm* — Foley & Lardner LLP (57) ABSTRACT

A dehumidifier includes a dehumidification system. The dehumidification system includes an air inlet, a cold energy storage, an evaporator, the cold energy storage, a condenser, and an air outlet for air to pass in sequence. The air inlet and the air outlet are disposed on a main body of the dehumidifier. The evaporator, the cold energy storage, and the condenser are fixedly mounted in the main body. The evaporator is used to cool the air so that moisture in the air is condensed into water droplets. A water tray is provided under the evaporator to collect the water droplets. The cold energy storage is disposed between the evaporator and the water tray for collecting the water droplets, absorbing cold energy and cooling the passing air. The condenser is used to heat the air to form dry air. The cold energy storage is to cool the air in advance, so that the moist and hot air becomes low-temperature and high-humidity air. The dehumidifier can reduce the power of the compressor, save energy, improve the dehumidification capacity, and improve the energy efficiency.

9 Claims, 6 Drawing Sheets

(56) References Cited

U.S. PATENT DOCUMENTS

| | | | |
|---|---|---|---|
| 7,194,870 B1* | 3/2007 | O'Brien | F24F 3/153 62/185 |
| 7,340,912 B1* | 3/2008 | Yoho, Sr. | F24F 3/1423 62/305 |
| 2003/0057085 A1* | 3/2003 | Azimi | B01D 3/10 203/11 |
| 2004/0244398 A1* | 12/2004 | Radermacher | B01D 5/0039 62/285 |
| 2006/0011331 A1* | 1/2006 | Lee | F24F 3/147 165/166 |
| 2008/0276630 A1* | 11/2008 | Lukitobudi | B01D 5/0057 62/93 |
| 2009/0205354 A1* | 8/2009 | Brown | F24F 3/1405 62/324.5 |
| 2016/0238269 A1* | 8/2016 | Kwon | F24F 1/022 |
| 2017/0016637 A1* | 1/2017 | Choi | F24F 3/14 |
| 2017/0219229 A1* | 8/2017 | Bujsaim | F24F 5/0035 |

* cited by examiner

DEHUMIDIFIER

CROSS-REFERENCE TO RELATED PATENT APPLICATIONS

The present application claims the benefit of and priority to Chinese Patent Application No. 201611165414.5, filed Dec. 16, 2016, the entire disclosure of which is incorporated herein by reference.

BACKGROUND

The present invention relates to a dehumidifier.

A conventional dehumidifier consists of a refrigeration circulation system and a dehumidification system. In the refrigeration circulation system, high-temperature and high-pressure refrigerant gas compressed and outputted from a compressor enters a condensing tube of a condenser and is cooled by means of heat exchange with the ambient air to be condensed into a normal-temperature and high-pressure liquid to enter an evaporator through the throttling of a capillary tube to absorb the heat in the air to become low-temperature and low-pressure gas, and then is drawn to the compressor to be compressed in a circulation manner. In the dehumidification system, the moist air becomes relatively low-temperature dry gas on the surface of the evaporator to be cooled to below the dew point temperature to form condensed water, so that the absolute moisture content in the air is lowered; and then enters the condenser, the air is heated by absorbing the heat of the refrigerant to become a dry gas to be discharged. In operation, since high-temperature and high-humidity air directly passes through the evaporator, the heat exchange capacity of the evaporator is larger. As a result, the power of the compressor is also larger. This will cause greater energy consumption, not meeting the energy-saving effect. Accordingly, the inventor of the present invention has devoted himself based on his many years of practical experiences to solve these problems.

SUMMARY

In view of the problems of the prior art, the primary object of the present invention is to provide a dehumidifier which is efficient and energy-saving.

In order to achieve the aforesaid object, the dehumidifier of the present invention comprises a dehumidification system. The dehumidification system includes an air inlet, a cold energy storage, an evaporator, the cold energy storage, a condenser, and an air outlet for air to pass in sequence. The air inlet and the air outlet are disposed on a main body of the dehumidifier. The evaporator, the cold energy storage, and the condenser are fixedly mounted in the main body. The evaporator is used to cool the air so that moisture in the air is condensed into water droplets. A water tray is provided under the evaporator to collect the water droplets. The cold energy storage is disposed between the evaporator and the water tray for collecting the water droplets, absorbing cold energy and cooling the passing air. The condenser is used to heat the air to form dry air.

Preferably, the cold energy storage is formed by stacking a plurality of ventilation boards. Each ventilation board has a plurality of ventilation holes arranged in a same direction. The ventilation holes of every adjacent two of the ventilation boards are perpendicular to each other.

Preferably, the ventilation boards each include a flat board and a folded board disposed on top of the flat plate. Spaces between the flat board and the folded plate are defined as the ventilation holes.

Preferably, the dehumidifier further comprises a refrigeration circulation system. The refrigeration circulation system includes a compressor fixedly mounted in the main body, an evaporating tube of the evaporator, and a condensing tube of the condenser. The compressor is connected with the condensing tube through a high-pressure tube. The condensing tube is connected with the evaporating tube through a capillary tube. The evaporating tube is connected with the compressor through a low-pressure tube.

Preferably, a humidity sensor is provided and fixedly mounted in the vicinity of the air inlet.

Preferably, a wind wheel is provided and fixedly mounted in the vicinity of the air outlet for drawing the moist air from the air inlet and discharging the dry air from the air outlet.

Preferably, a plurality of casters are fixedly mounted beneath the main body.

The beneficial effect of the present invention is described hereinafter. Compared with the prior art, the present invention provides the cold energy storage to cool the air in advance, so that the moist and hot air becomes the low-temperature and high-humidity air. The present invention can reduce the power of the compressor, save energy and improve the dehumidification capacity and improve the energy efficiency.

DETAILED DESCRIPTION

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Figure 1:
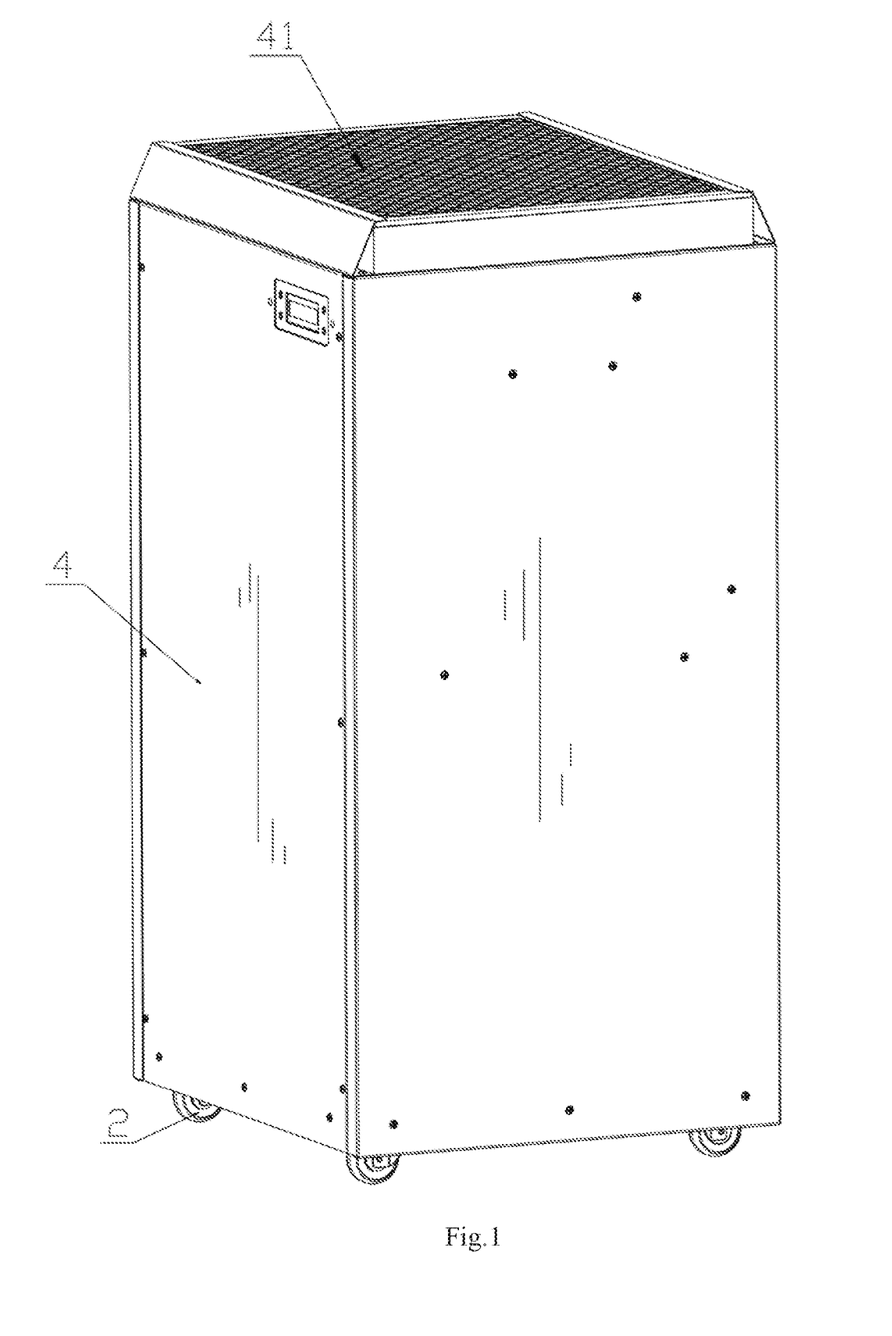
FIG. 1 is a perspective view of the dehumidifier of the present invention.
Figure 2:
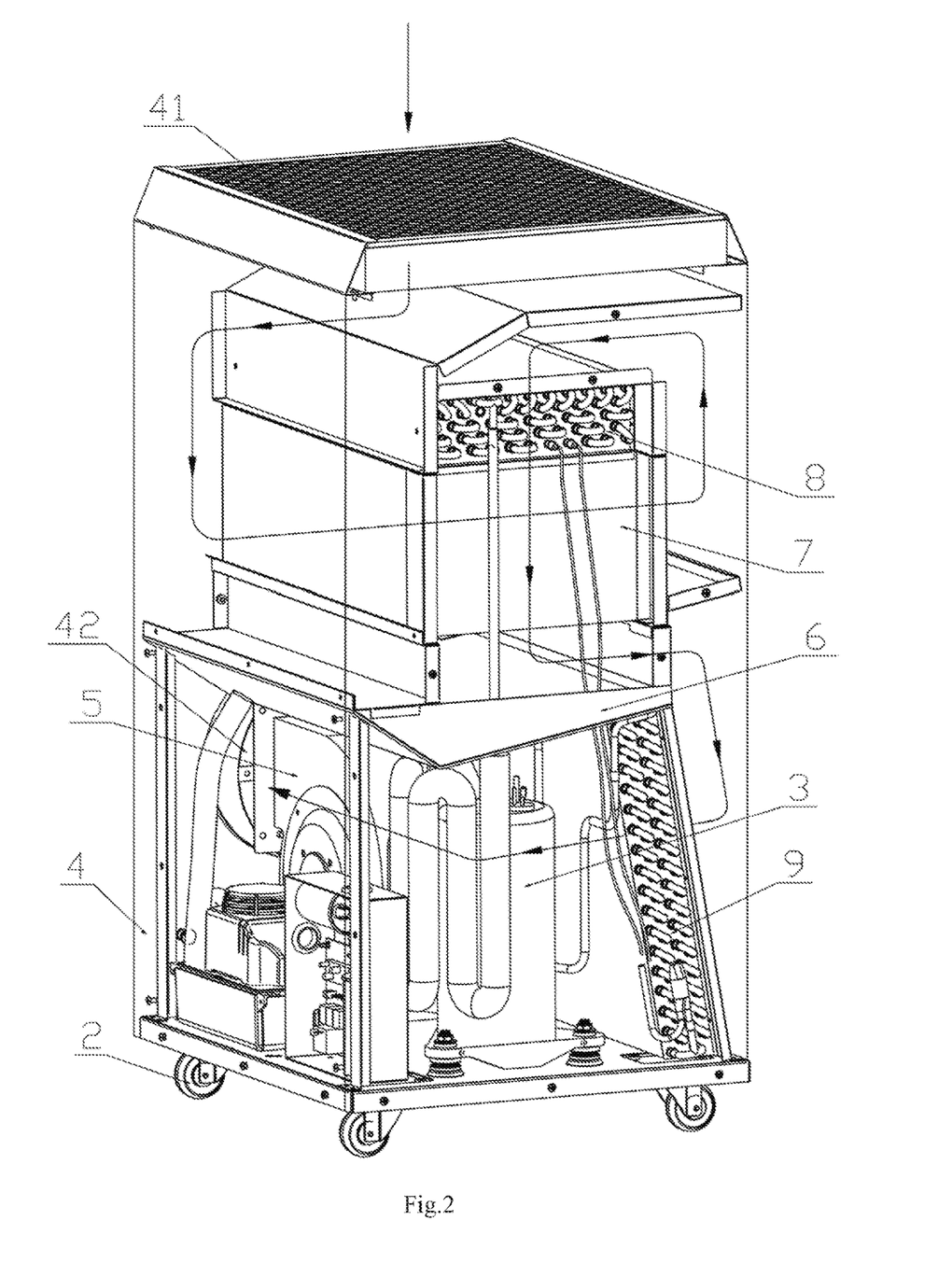
FIG. 2 is a schematic view of the dehumidifier removing part of the main body of the present invention.
Figure 3:
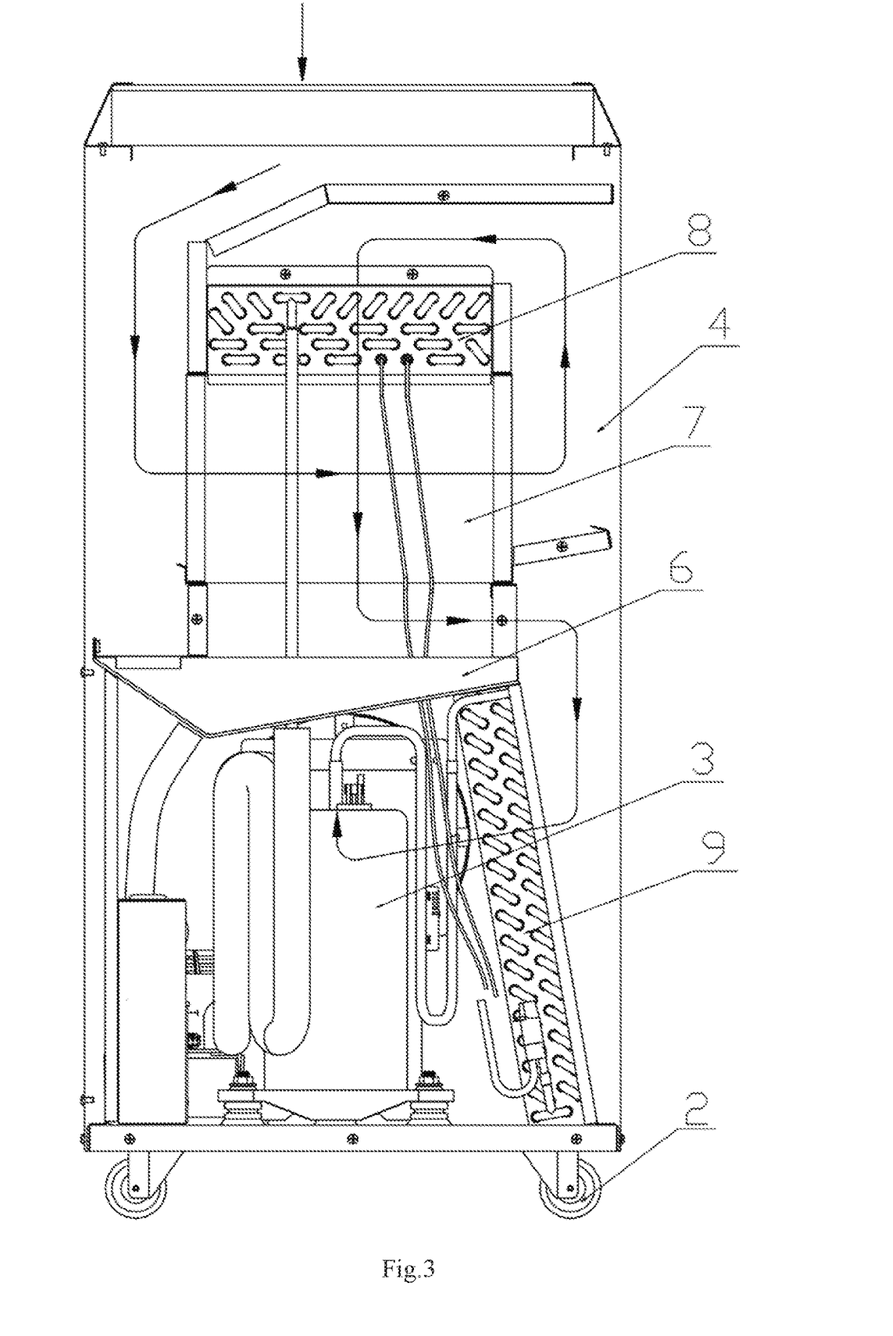
FIG. 3 is a side view of the dehumidifier of the present invention.
Figure 4:
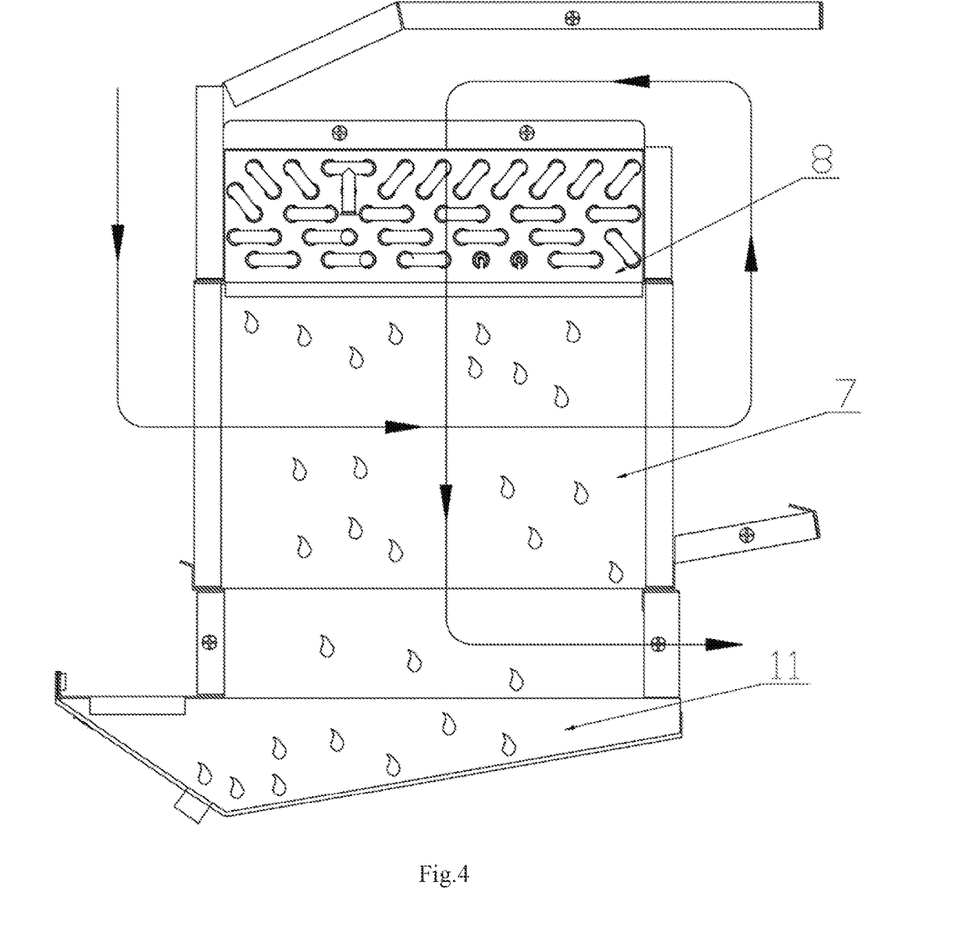
FIG. 4 is a schematic view showing the cold energy storage of the dehumidifier of the present invention.
Figure 5:
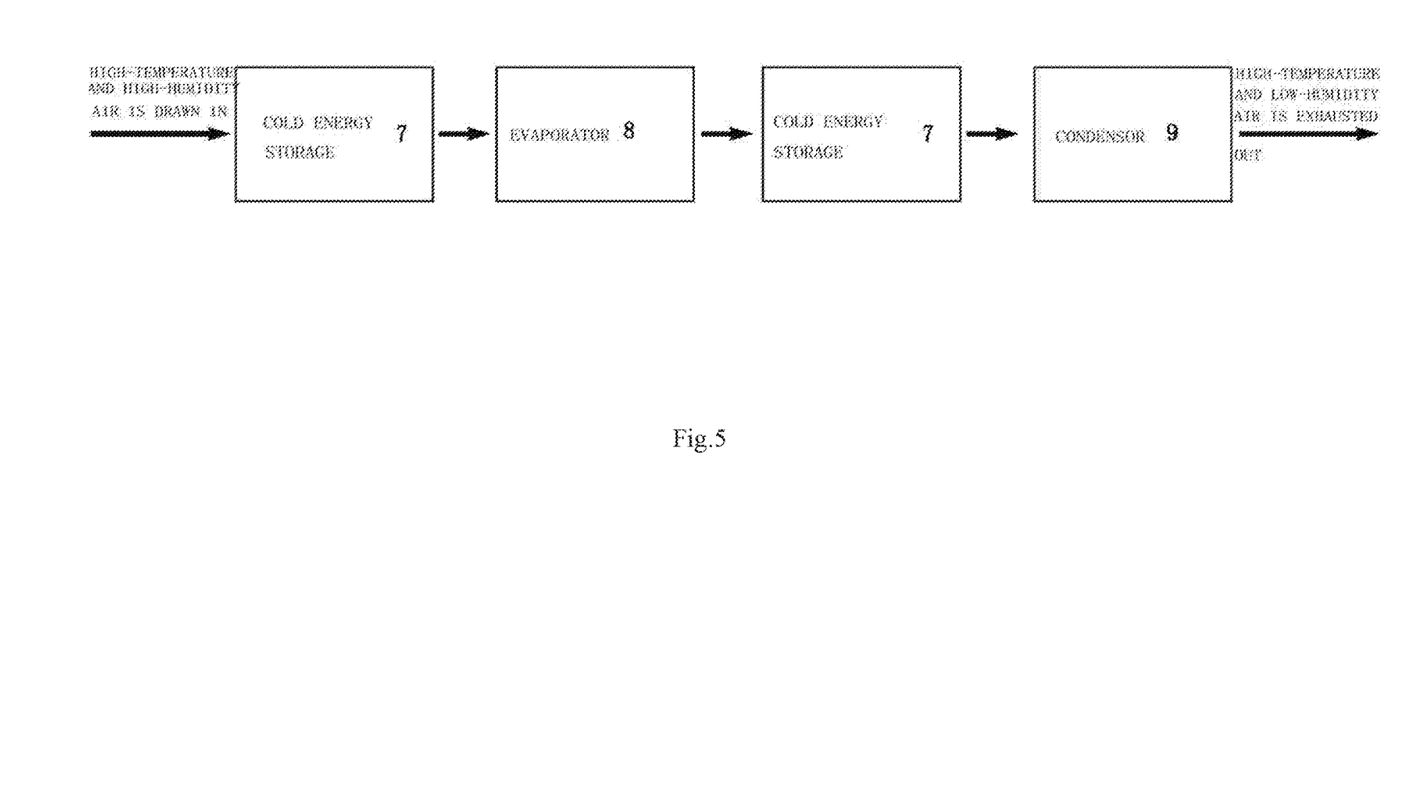
FIG. 5 illustrates the flowchart of the dehumidification system of the dehumidifier of the present invention.

FIG. 1 to FIG. 3 illustrates the structure of a dehumidifier of the present invention. FIG. 4 illustrates the structure of a cold energy storage. FIG. 5 illustrates the flowchart of a dehumidification system. The dehumidifier includes a dehumidification system. The dehumidification system includes an air inlet 41, a cold energy storage 7, an evaporator 8, the cold energy storage 7, a condenser 9, and an air outlet 42 for air to pass in sequence. The air inlet 41 and the air outlet 42 are disposed on a main body 4 of the dehumidifier. The evaporator 8, the cold energy storage 7, and the condenser 9 are fixedly mounted in the main body 4. The evaporator 8 is used to cool the air so that the moisture in the air is condensed into water droplets. A water tray 6 is provided under the evaporator 8 to collect the water droplets. The cold energy storage 7 is disposed between the evaporator 8 and the water tray 6 for collecting the water droplets, absorbing the cold energy and cooling the passing air. The condenser 9 is used to heat the air to form dry air. Through the arrangement of the cold energy storage, when the condensed water passes through the cold energy storage 7, the water droplets slowly flow along the aluminum foil boards to the water tray.

Figure 6:
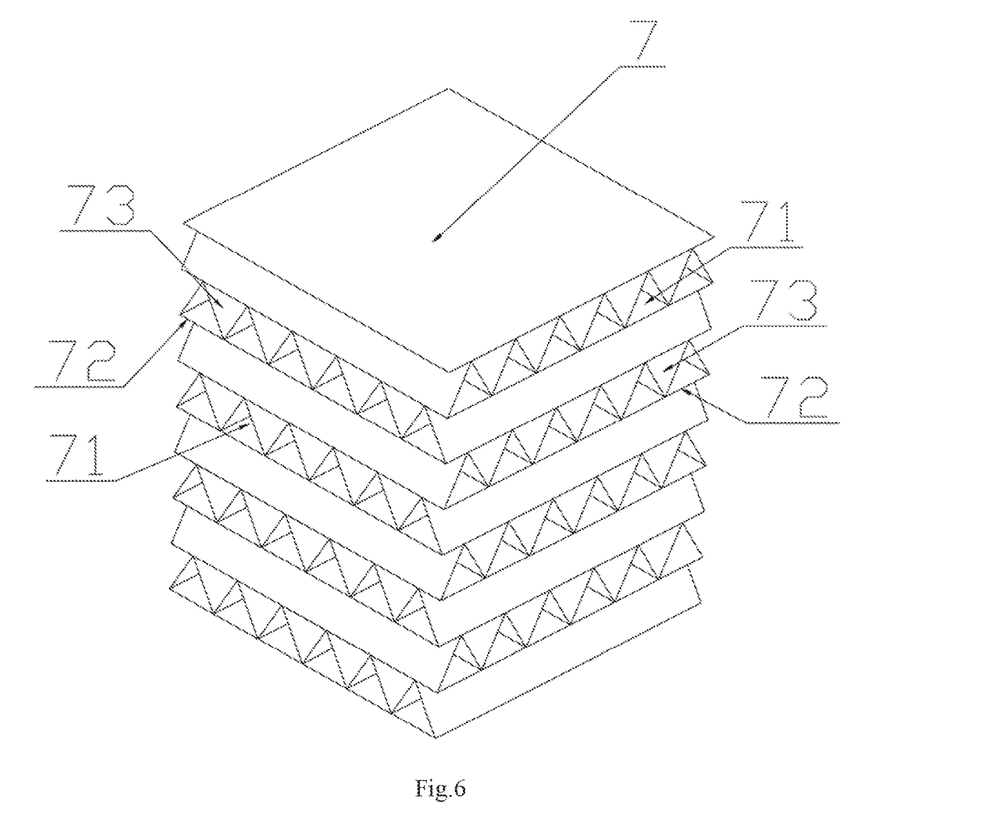
FIG. 6 is a perspective view showing the cold energy storage of the dehumidifier of the present invention.

As shown in FIG. 6, the cold energy storage 7 is formed by stacking a plurality of ventilation boards. Each ventilation board has a plurality of ventilation holes 71 arranged in a same direction. The ventilation holes 71 of every adjacent two of the ventilation boards are perpendicular to each other, so that the air passes through the cold energy storage twice to provide a cooling effect.

Each ventilation board includes a flat board 72 and a folded board 73 disposed on top of the flat plate 72. The spaces between the flat board 72 and the folded plate 73 are defined as the ventilation holes 71. The ventilation holes may be semicircular, triangular or other shapes to increase the contact area between the air and the cold energy storage as well as the water droplets.

The flat board 72 and the folded board 73 are each made of an aluminum foil board. The heat transfer performance of the aluminum foil board is good. The aluminum foil board can absorb the cold energy of the water droplets continuously. When the moist and hot air passes through the cold energy storage, the moist and hot air meets the aluminum foil board and the water droplets to lower the temperature of the air in advance to form low-temperature and high-humidity air. This can reduce the heat exchange capacity of the evaporator.

The dehumidifier further comprises a refrigeration circulation system. The refrigeration circulation system includes a compressor 3 fixedly mounted in the main body 4, an evaporating tube of the evaporator 8, and a condensing tube of the condenser 9. The compressor 3 is connected with the condensing tube through a high-pressure tube. The condensing tube is connected with the evaporating tube through a capillary tube. The evaporating tube is connected with the compressor 3 through a low-pressure tube. In operation, the compressor draws low-temperature and low-pressure refrigerant from the evaporator and compresses it into a high-temperature and high-pressure gas to pass through the high-pressure tube to enter the condensing tube of the condenser to be condensed into a liquid and release heat. After passing through the capillary tube, it is throttled and depressurized to enter the evaporating tube of the evaporator. The liquid refrigerant absorbs the heat of the air to be evaporated into gas to be circulated to the compressor through the low-pressure tube again.

An expander is provided between the compressor and the evaporating tube for expanding the refrigerant.

A humidity sensor is provided and fixedly mounted in the vicinity of the air inlet 41 for detecting the humidity in the air. When the detected humidity reaches the preset value, the refrigeration circulation system is started. When the detected humidity does not reach the preset value, the refrigeration circulation system is not activated or shut off. The refrigeration circulation system of the dehumidifier can be intelligently controlled to save energy.

A wind wheel 5 is provided and fixedly mounted in the vicinity of the air outlet 42 for drawing the moist air from the air inlet 41 and discharging the dry air from the air outlet 42.

The water in the water tray 6 is drained through a drain pipe.

A plurality of casters 2 are fixedly mounted beneath the main body 4 for the user to move the dehumidifier conveniently.

When in use, the wind wheel is started, high-humidity and high-temperature air is drawn from the air inlet; the moist and hot air passes through the cold energy storage to lower the temperature of the air in advance to form high-humidity and low-temperature air; the high-humidity and low-temperature air passes through the evaporator to be further cooled; the moisture in the air is condensed on the surface of the evaporator to form water droplets; the water droplets passes through the cold energy storage and flows to the water tray and finally are drained through the drain pipe; the air passing through the evaporator becomes low-temperature and low-humidity air to enter the cold energy storage again for the air to further absorb the cold energy, the low-temperature and low-humidity air after absorbing the cold energy passes through the condenser to be heated to become high-temperature and low-humidity air; finally, the high-temperature and low-humidity air is discharged from the air outlet by the wind wheel. The dehumidifier of the present invention lowers the temperature of the high-humidity and high-temperature air in advance to reduce the power of the compressor so as to save the energy and improves the dehumidification capacity and improves the energy efficiency.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A dehumidifier, comprising:
a dehumidification system including an air inlet, a cold energy storage, an evaporator, a condenser, and an air outlet for air to pass in sequence, wherein:
the air inlet and the air outlet are disposed on a main body of the dehumidifier;
the evaporator, the cold energy storage, and the condenser are fixedly mounted in the main body;
the evaporator is used to cool the air so that moisture in the air is condensed into water droplets;
a water tray is provided under the evaporator to collect the water droplets;
the cold energy storage is disposed between the evaporator and the water tray for collecting the water droplets, absorbing cold energy and cooling the passing air; and
the condenser is used to heat the air to form dry air;
wherein the dehumidifier is configured to operate such that:
high-humidity and high-temperature air is drawn from the air inlet;
the high-humidity and high-temperature air passes through the cold energy storage to lower the temperature of the air in advance of the evaporator to form high-humidity and low-temperature air;
the high-humidity and low-temperature air passes through the evaporator to be further cooled;
the moisture in the high-humidity air is condensed on a surface of the evaporator to form the water droplets;
the water droplets pass through the cold energy storage and flow to the water tray and finally are drained through a drain pipe;
the high-humidity and low-temperature air passing through the evaporator becomes low-temperature and low-humidity air to enter the cold energy storage again for the air to further absorb the cold energy to create lower-temperature and lower-humidity air;

the lower-temperature and lower-humidity air passes through the condenser to be heated to become high-temperature and low-humidity air; and the high-temperature and low-humidity air is discharged from the air outlet as the dry air; and wherein the cold energy storage is defined by a plurality of ventilation boards arranged to cool both the high-humidity and high-temperature air drawn from the air inlet and the low-temperature and low-humidity air leaving the evaporator.

2. The dehumidifier as claimed in claim 1, wherein the cold energy storage is formed by stacking the plurality of ventilation boards, each ventilation board has a plurality of ventilation holes arranged in a same direction, and the ventilation holes of every adjacent two of the ventilation boards are perpendicular to each other.

3. The dehumidifier as claimed in claim 2, wherein the ventilation boards each include a flat board and a folded board disposed on top of the flat plate, and spaces between the flat board and the folded plate are defined as the ventilation holes.

4. The dehumidifier as claimed in claim 1, further comprising a refrigeration circulation system, the refrigeration circulation system including a compressor fixedly mounted in the main body, an evaporating tube of the evaporator, and a condensing tube of the condenser, the compressor being connected with the condensing tube through a high-pressure tube, the condensing tube being connected with the evaporating tube through a capillary tube, the evaporating tube being connected with the compressor through a low-pressure tube.

5. The dehumidifier as claimed in claim 4, wherein a humidity sensor is provided and fixedly mounted in the vicinity of the air inlet.

6. The dehumidifier as claimed in claim 1, wherein a wind wheel is provided and fixedly mounted in the vicinity of the air outlet for drawing moist air from the air inlet and discharging dry air from the air outlet.

7. The dehumidifier as claimed in claim 1, wherein a plurality of casters are fixedly mounted beneath the main body.

8. The dehumidifier as claimed in claim 3, wherein the flat board and the folded board are each made of an aluminum foil board.

9. The dehumidifier as claimed in claim 4, further comprising an expander provided between the compressor and the evaporating tube for expanding a refrigerant.

* * * * *

UNITED STATES PATENT AND TRADEMARK OFFICE
CERTIFICATE OF CORRECTION

PATENT NO. : 10,436,461 B2  
APPLICATION NO. : 15/588807  
DATED : October 8, 2019  
INVENTOR(S) : Rui Zhou Page 1 of 1

It is certified that error appears in the above-identified patent and that said Letters Patent is hereby corrected as shown below:

On the Title Page

Item (73) Assignee should read:  
-- (73) Assignee: Ningbo Free Trade Zone Refine Mould Technology Co., LTD. (CN). --

Signed and Sealed this  
Eighteenth Day of February, 2020

Andrei Iancu  
*Director of the United States Patent and Trademark Office*